United States Patent
Mir et al.

(10) Patent No.: US 6,803,740 B2
(45) Date of Patent: Oct. 12, 2004

(54) METHOD AND APPARATUS FOR DETERMINING PHASE CURRENT OF SWITCHED RELUCTANCE ELECTRIC MACHINES

(75) Inventors: Sayeed A. Mir, Saginaw, MI (US); Tomy Sebastian, Sagniaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 90 days.

(21) Appl. No.: 10/280,836

(22) Filed: Oct. 25, 2002

(65) Prior Publication Data

US 2004/0080296 A1 Apr. 29, 2004

(51) Int. Cl.[7] .............................................. H02P 7/36
(52) U.S. Cl. ...................... 318/701; 318/254; 318/608; 318/683; 318/821; 318/439
(58) Field of Search ................................ 318/254, 439, 318/138, 701, 608, 821, 683, 700, 711, 714, 724

(56) References Cited

U.S. PATENT DOCUMENTS

| 5,589,751 | A | * | 12/1996 | Lim | 318/701 |
|---|---|---|---|---|---|
| 5,754,024 | A | | 5/1998 | Sugiyama | 318/701 |
| 5,786,681 | A | * | 7/1998 | Kalpathi | 318/701 |
| 5,859,518 | A | * | 1/1999 | Vitunic | 318/701 |
| 6,181,092 | B1 | * | 1/2001 | Turner | 318/254 |
| 6,242,874 | B1 | | 6/2001 | Kalpathi et al. | 318/254 |
| 6,366,048 | B2 | | 4/2002 | Greif | 318/701 |
| 6,407,528 | B1 | | 6/2002 | Disser et al. | 318/701 |
| 6,411,060 | B1 | | 6/2002 | Jung | 318/701 |
| 6,452,356 | B1 | | 9/2002 | Sugiyama et al. | 318/599 |

* cited by examiner

Primary Examiner—Rita Leykin
(74) Attorney, Agent, or Firm—Michael D. Smith

(57) ABSTRACT

A method for determining phase current for each of a plurality of individual phase coils of a switched reluctance machine (SRM) is disclosed. In an exemplary embodiment, the method includes determining the current passing through a first resistive element and a second resistive element in an SRM drive circuit. A conduction mode of the SRM drive circuit is determined, the conduction mode being based upon an ON/OFF state of each of a pair of switching transistors controlling current through each of the plurality of individual phase coils. The phase current through each of the plurality of individual phase coils is then calculated, based upon the conduction mode and the determined current passing through said first resistive element and second resistive elements.

16 Claims, 7 Drawing Sheets

METHOD AND APPARATUS FOR DETERMINING PHASE CURRENT OF SWITCHED RELUCTANCE ELECTRIC MACHINES

BACKGROUND

The present disclosure relates generally to switched reluctance motor controls and, more particularly, to a method and apparatus for determining phase current of switched reluctance electric machines.

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles, wherein the windings around any two diametrically opposed stator poles may be connected in series or in parallel to define one motor phase of the multiphase SRM. The windings associated with a motor phase are also referred to as a phase coils. By generating current through the phase coils, magnetic fields are established about the stator poles and a torque is thereby produced that attracts a pair of rotor poles into alignment with the stator poles.

The current in the phase coils is generated in a predetermined sequence in order to produce a constant torque on the rotor. The period during which current is provided to the phase coil (and during which the rotor poles are brought into alignment with the stator poles) is known as the "active stage" or conduction interval of the motor phase. At a certain point, either as the rotor poles become aligned with the stator poles or at some point prior thereto, it becomes desirable to commutate the current in the phase coil to prevent a negative or braking torque from acting on the rotor poles. Once this commutation point is reached, current is no longer generated in the phase coil and the current is allowed to dissipate from the phase coil. The period during which current is allowed to dissipate from the phase coil is known as the "inactive stage" of the motor phase.

The general method of controlling/commutating a switched reluctance motor for servo applications is by regulating the current flowing through each phase as a function of motor position. In order to implement such control, active current feedback information from each phase of the motor is used during the control operation. Typically, the current feedback information is obtained through current sensing devices placed within the individual phases of the motor.

One common type of current sensing device used in SRM control circuit applications is a Hall effect sensor configured within each individual phase of the motor. FIG. 1 illustrates an SRM power circuit 10 having four Hall effect sensors 12 configured within each phase (A, B, C and D) of a four-phase SRM drive. The current sensed by each individual Hall effect sensor is converted into an equivalent voltage, which is thereafter amplified by four corresponding amplification circuits (not shown) and fed into four corresponding A/D channels (not shown) for digital control applications.

In precise torque control applications, such as in electric power steering systems or steer-by-wire systems, for example, a very strict part to part variation tolerance of the Hall sensors is desired in order to keep the torque ripple low. In addition, since each motor phase requires a separate Hall sensor, the costs associated with multiple sensors are increased. As such, it is desirable to implement a current sensing method and system for SRM motors that is both cost effective and that also provides a complete measurement of all phase currents present in each of the motor phases.

SUMMARY

The above discussed and other drawbacks and deficiencies of the prior art are overcome or alleviated by a method for determining phase current for each of a plurality of individual phase coils of a switched reluctance machine (SRM). In an exemplary embodiment, the method includes determining the current passing through a first resistive element and a second resistive element in an SRM drive circuit. A conduction mode of the SRM drive circuit is determined, the conduction mode being based upon an ON/OFF state of each of a pair of switching transistors controlling current through each of the plurality of individual phase coils. The phase current through each of the plurality of individual phase coils is then calculated, based upon the conduction mode and the determined current passing through said first and second resistive elements.

In another aspect, an apparatus for determining phase current for each of a plurality of individual phase coils of a switched reluctance machine (SRM) includes an SRM drive circuit including a pair of switching transistors associated with each of the plurality of individual phase coils. A first resistive element is in selective connection with each of the plurality of individual phase coils, and a second resistive element is in selective connection with each of the plurality of individual phase coils. The phase current for each of the plurality of individual phase coils is calculated based upon values of current sensed in the first and second resistive elements and upon an ON/OFF state of each of the pair of switching transistors.

BRIEF DESCRIPTION OF THE DRAWINGS

Referring to the exemplary drawings wherein like elements are numbered alike in the several Figures.

DETAILED DESCRIPTION

Disclosed herein is a method and apparatus for determining the phase current of switched reluctance electric machines that is directed to both reducing the number of current sensors, as well as to using low cost resistive sensors in lieu of the more expensive Hall effect sensors. Briefly stated, an SRM drive circuit features two different ground planes established by connecting all of the low-side power switching devices (e.g., MOSFETs or IGBTs) to one ground plane, and connecting all of the low-side diodes to the other ground plane. Each ground plane is in turn connected to a main bus ground through a corresponding resistive current sensor.

The current sensed by the resistive sensor connected to the power device bus represents the conducting phase current, while the current flowing through the resistive sensor connected to the diode bus represents the commutating phase current. The sensed currents are amplified and fed into a processing device, wherein a software algorithm is then used to determine the phase currents through the inverter switching information (i.e., the conductive states of the transistors). As a result, a low cost SRM drive is provided that avoids the effects of part-to-part variation of Hall effect sensing circuits.

Figure 2:
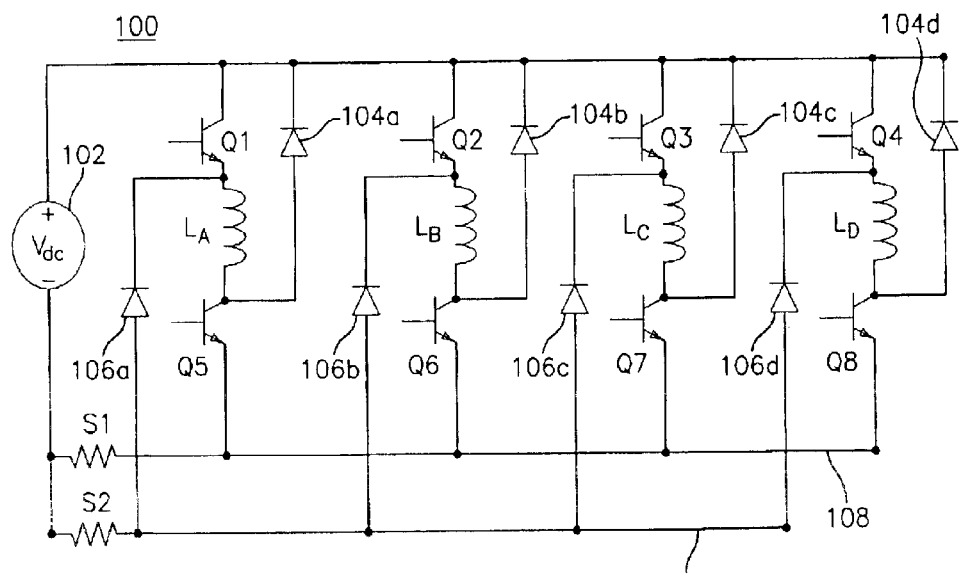
FIG. 2 is a schematic diagram of an SRM drive circuit for a four-phase switched reluctance motor drive, in accordance with an embodiment of the present invention, in which only two current sensors are used to sense the current in each of the four phases of the motor.

Referring initially to FIG. 2, there is shown a schematic diagram of an SRM drive circuit 100 for a four-phase switched reluctance motor drive, in accordance with an embodiment of the present invention. It will be appreciated that although drive circuit 100 is configured for a four-phase SRM, the principles disclosed herein are applicable to motors having a different number of phases. Those skilled in the art will recognize the chopper controller configuration in which one end of each coil ($L_A$, $L_B$, $L_C$ and $L_D$) of the SRM is associated with a high-side switching transistor (Q1, Q2, Q3 and Q4, respectively) connected to the positive pole of a DC power source 102. The other end of each of the coils ($L_A$, $L_B$, $L_C$ and $L_D$) is associated with a low-side switching transistor (Q5, Q6, Q7 and Q8, respectively) connected to the negative pole of DC power source 102.

Figure 1:
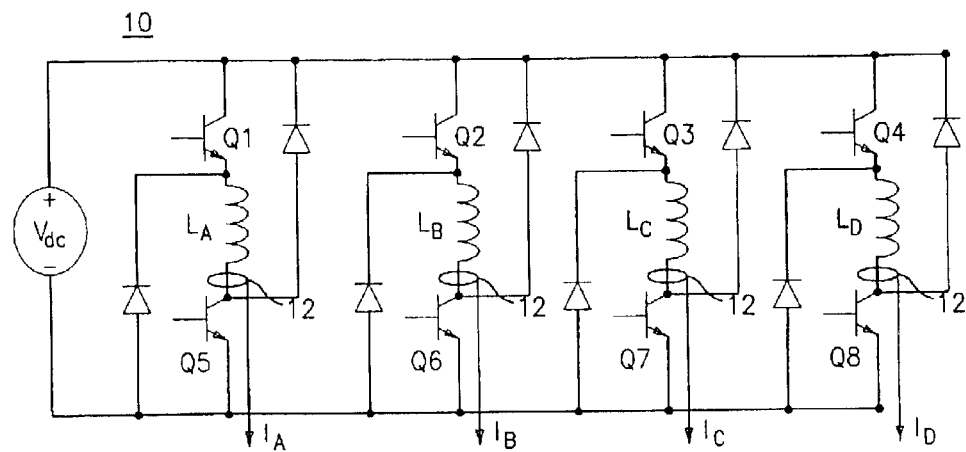
FIG. 1 is a schematic diagram of a conventional SRM drive circuit having Hall effect sensors configured within each phase of a four-phase SRM.

In addition, the circuit 100 includes a series of high-side freewheeling diodes 104a, 104b, 104c and 104d, as well a series of low-side freewheeling diodes 106a, 106b, 106c and 106d, that are reverse-biased with respect to the polarity of the DC voltage source 102. However, unlike the conventional circuit 10 of FIG. 1, the circuit 100 further includes a first ground bus 108 and a second ground bus 110, wherein the low-side switching transistors Q5, Q6, Q7 and Q8 are connected to the first ground bus 108 and the anode terminals of the low-side diodes 106a, 106b, 106c and 106d are connected to the second ground bus 110.

As stated previously, instead of having one Hall effect sensor for each motor phase, the circuit 100 instead uses a pair of current sensing resistors, S1 and S2. Resistor S1 is serially connected with first ground bus 108, while resistor S2 is serially connected with second ground bus 110. During commutation of the phase currents of the SRM circuit 100, the measured values of the current in each resistor, coupled with the switching status of the transistors will provide reliable phase current information to be used in applying control signals to the transistors.

Figure 3:
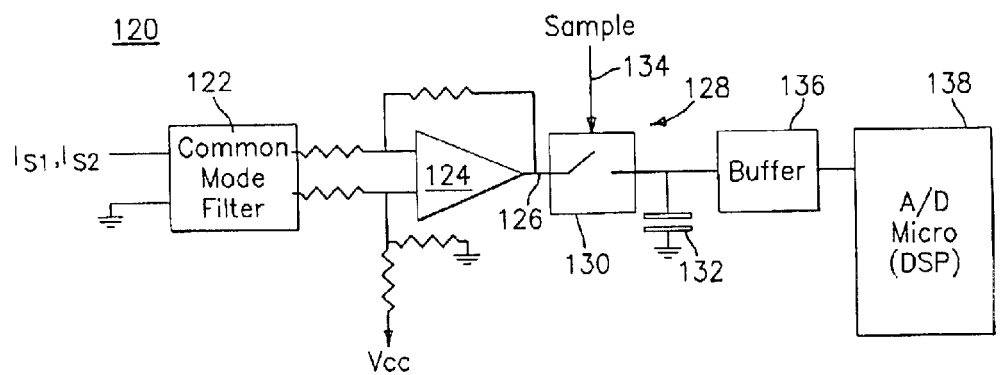
FIG. 3 is a schematic diagram of an exemplary current amplifier/sample and hold circuit that may be used to sample the phase currents passing through the resistive current sensors of FIG. 2.
Figure 4:
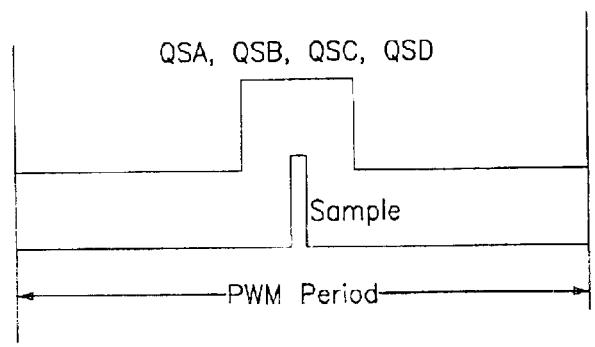
FIG. 4 is a graph illustrating the duration of the sample and hold signal pulse applied to the circuit of FIG. 3, with reference to the PWM cycle of each SRM phase.

FIG. 3 is a schematic diagram of an exemplary current amplifier/sample and hold circuit 120 that may be used to sample the phase currents passing through the current sensing resistors S1, S2. For ease of description, FIG. 3 illustrates one such circuit for either S1 or S2, but it should be understood that in actuality there would be a separate amplifier/sample and hold circuit for each sensing resistor. The voltage across the sensing resistor (S1 or S2 as the case may be) is first passed through a common mode filter circuit 122 before being fed into an amplifier 124. Then, the amplified signal 126 is fed into a sample and hold circuit 128 that includes a switching mechanism 130 (e.g., a transistor) and a storage capacitor 132. The closing of the switching mechanism is controlled by a pulsed sample signal 134 that is activated when it is desired to sample the current through a particular sensing resistor. Finally, the voltage across storage capacitor 132 is sent through a buffer 136 before being inputted to an A/D converter for digital signal processing by the control system microprocessor (both indicated generally by processing device 138).

In a preferred embodiment, a center-based pulse width modulation (PWM) technique is used for the switching devices (MOSFETS). The pulse of the sample signal 134 is a relatively narrow pulse of short duration (e.g., about 2 microseconds) with respect to the pulse period of the high-side switching transistors Q1, Q2, Q3 and Q4, and occurring roughly in the middle of the upper PWM period (e.g., about every 50 microseconds). In the center-based PWM technique, the sample signal 134 is activated when a given phase is in the conduction position during the chopping control of the phase. If one phase is in a "chopping" mode and another phase is in a "soft commutation" mode, then the current through S1 will be the sum of two phase currents, while the current through S2 will be the commutation phase current. However, if one phase is in the chopping mode and another phase is in a "hard commutation" mode, then current through S1 will be the chopping phase current, while the current through S2 will be the commutation phase current.

Figure 5A:
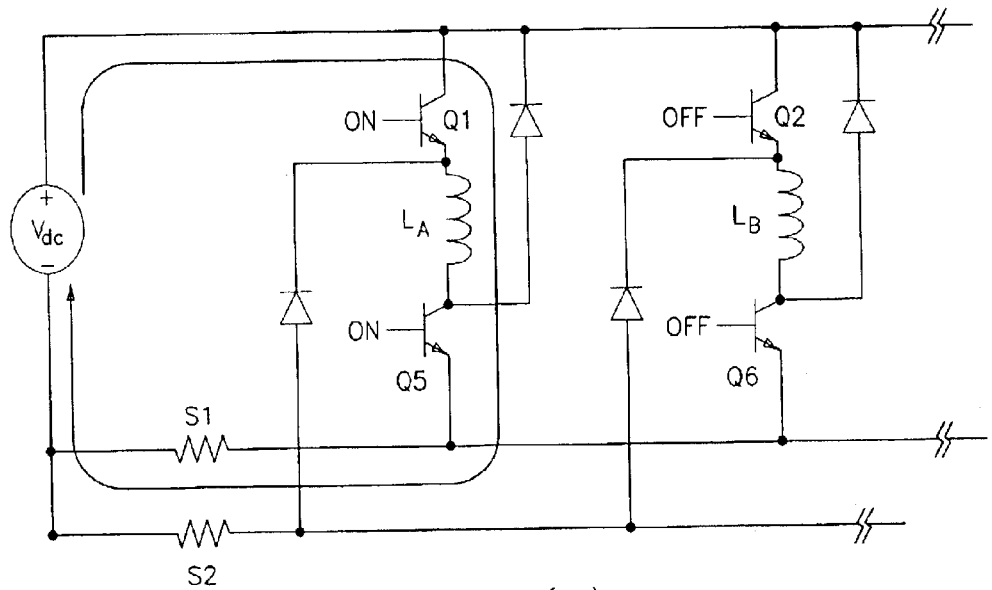
FIGS. 5(a) through 5(c) illustrate a portion of the SRM drive circuit of FIG. 2 during various conduction stages of the commutation cycle, particularly illustrating the current flow through the two current sensors.
Figure 5B:
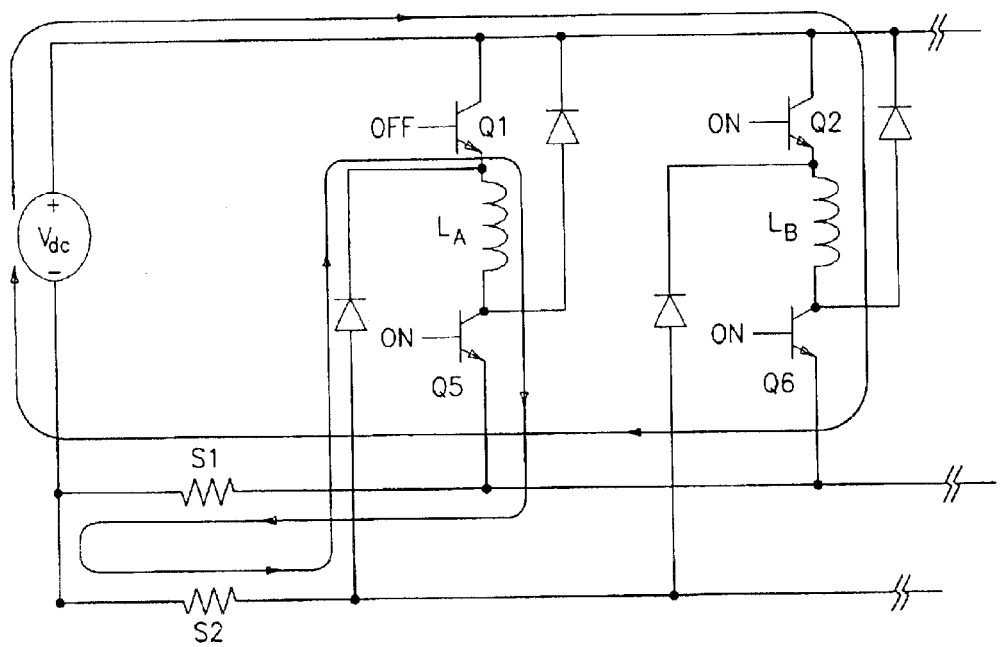
Figure 5C:
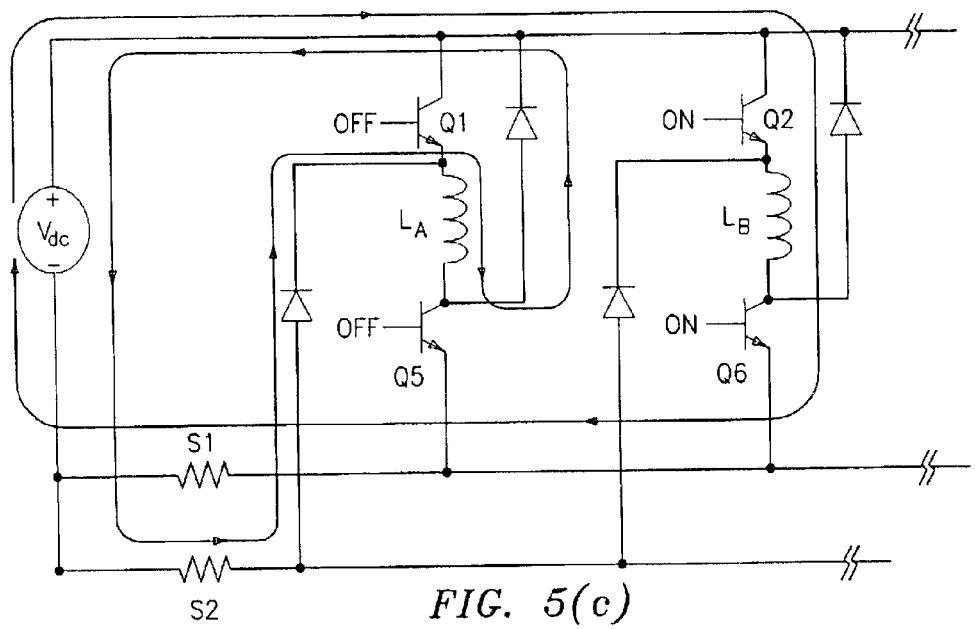

FIGS. 5(a) through 5(c) provide a clearer understanding of the current flow through the current sensing resistors S1 and S2 during each conduction mode of the SRM. For ease of description, only the first two phases of the SRM circuit 100 are shown in FIGS. 5(a) through 5(c) in order to demonstrate the conduction cycle of phases "A" and "B". As is shown in FIG. 5(a), the conduction in the motor phase "A" is commenced by turning on both high-side transistor Q1 and low-side transistor Q5. During this conduction mode, the current in phase "A" passes through coil $L_A$ and directly through current sensing resistor S1. However, no current flows through current sensing resistor S2 at this point. Further, Q2 and Q6 of phase "B" are off, and thus no current passes through coil $L_B$. Once the current in phase "A" reaches the desired value, it is then regulated by PWM control of Q1 while Q5 remains on.

FIG. 5(b) illustrates the "commutation mode" of conduction wherein the high-side transistor Q1 is turned off and the low-side transistor is left on. At this point, a feedback current caused by the voltage induced in $L_A$ flows through low-side freewheeling diode 106a. Therefore, the phase current from coil $L_A$ flows though both S1 and S2. At the same time, Q2 and Q6 are switched on to begin the current flow through coil $L_B$. Thus, it will be seen in FIG. 5(b) that S1 has both a current component from coil $L_A$ and a current component from coil $L_B$ flowing therethrough.

Then, in the third mode of conduction (i.e., the "freewheeling mode", both Q1 and Q5 are switched off, as shown in FIG. 5(c). Again, due to the induced voltage in $L_A$, current will flow through both through low-side freewheeling diode 106a and through high-side freewheeling diode 106a, effectively feeding power back to the DC source 102. It will now be seen that during the freewheeling mode, the phase current from coil $L_A$ flows through S2 but not S1. However, since Q2 and Q6 remain on, the phase current from coil $L_B$ flows through S1 but not S2. Eventually, the energy in coil will be dissipated, as phase "B" enters the commutation mode and subsequently the freewheeling mode while phase "C" (not shown in FIGS. 5(a)–5(c)) begins the conduction mode. The process will thus shift through each phase in the direction mentioned. Naturally, the direction, of energization of the phase coils may be reversed; that is, the progression A-D-C-B may be used to reverse the direction of the SRM.

Figure 6:
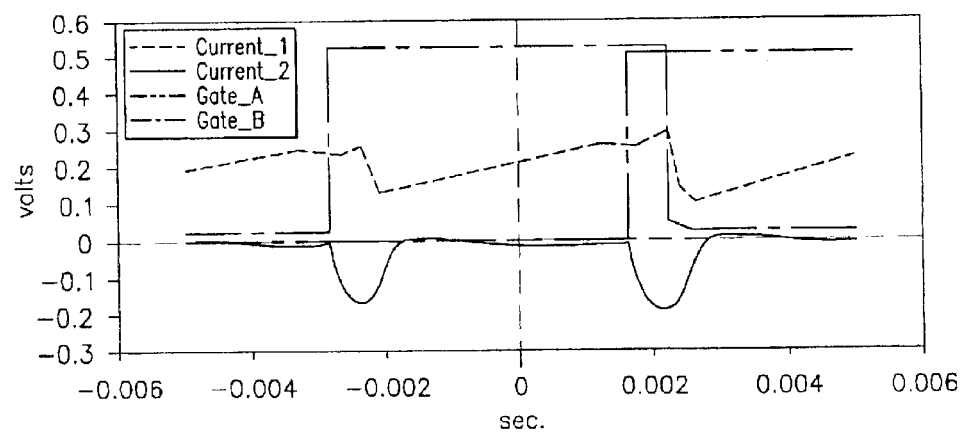
FIG. 6 is a graph illustrating the current flow through the current sensing resistors during a portion of the commutation cycle.

In FIG. 6, the graph therein illustrates the relationship between the current flow through the current sensing resistors S1 and S2 with respect to the gate voltages at the low-side transistors of phases "A" and "B". Specifically, the currents are shown for an entire conduction period of phase "A". Depending upon the motor speed, a number of PWM cycles (not shown in FIG. 6) may be executed during the conduction period of a phase. At the start of conduction of phase "A", the current through S1 (Current_1) starts to increase thus indicating the development of current in phase coil $L_A$. At this point, the current through phase coil $L_D$ of phase "D" is discharging (first with zero voltage, and then with a negative bus voltage). This is indicated by a flat portion of Current_1 and a quick drop of Current_2 (the current through S2) at the start. During this "hard discharge" is when phase "D" sees the negative voltage and all the current from coil $L_D$ passes through S2.

Figure 7A:
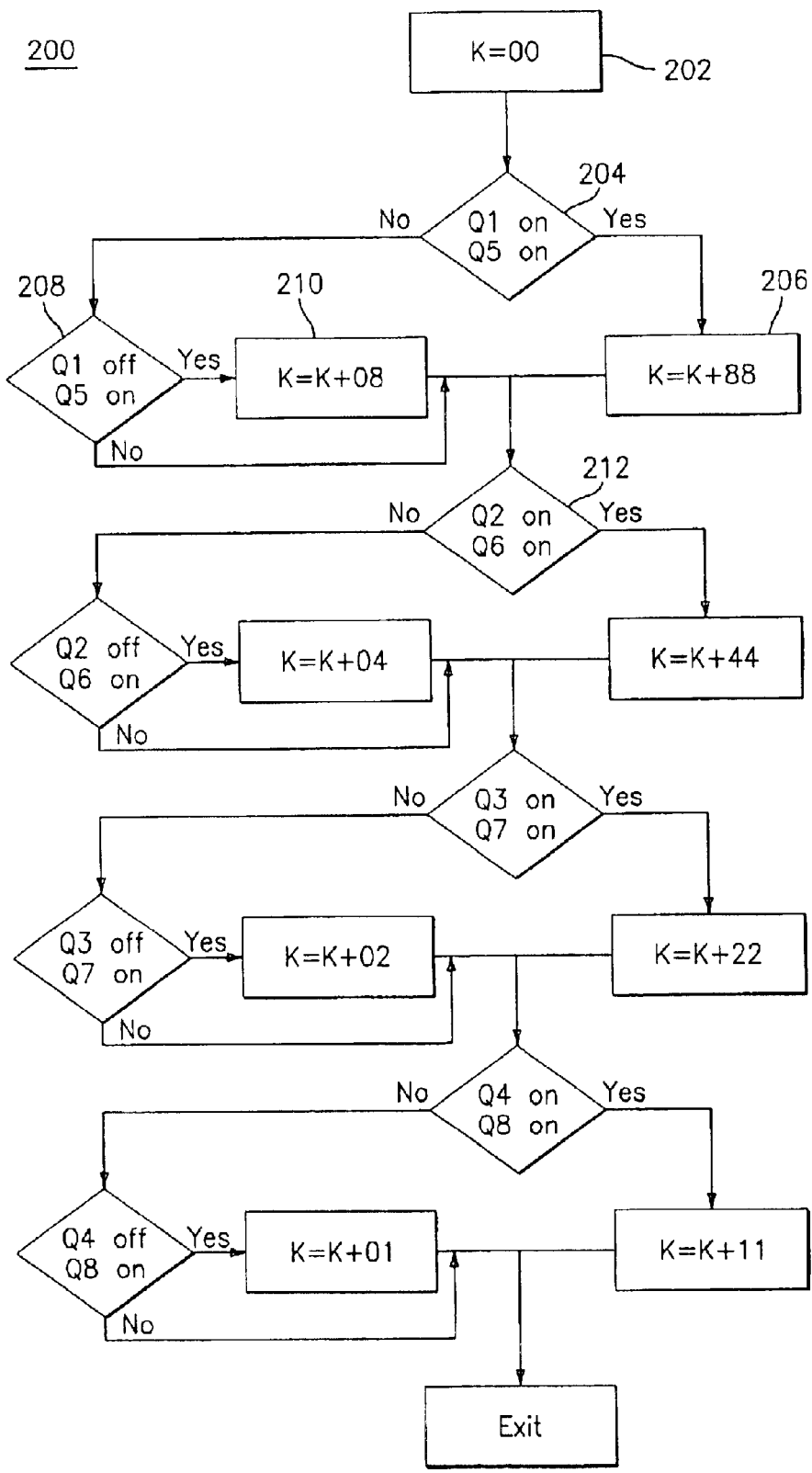
FIG. 7(a) is a flow diagram illustrating one possible subroutine determining a conduction mode, K, of the SRM drive circuit, based upon the ON/OFF state of each of the transistors Q1–Q8.

Referring now to FIG. 7(a), there is shown a flow diagram that illustrates one possible subroutine 200 for determining a conduction mode, K, of the SRM drive circuit 100, based upon the ON/OFF state of each of the transistors Q1–Q8. In turn, based upon the value of K, the current values through each phase coil may be calculated. In effect, the subroutine 200 runs through a series of inquiries as to the ON/OFF state as to the high-side/low-side transistor pairs for each phase. For each transistor pair, the method checks to see if either both transistors in the pair are on, and also checks to see whether the high-side transistor is off, while the low-side transistor is on.

Depending upon which transistors are on, the subroutine 200 will adjust the value of K in accordance with a two digit, hexadecimally-encoded weighted value. The first digit of K represents a summary of which of the high-side transistors are on, while the second digit of K represents a summary of which of the low-side transistors are on. To distinguish between the phases, the value of an "on" transistor in phase "D" is 1, the value of an "on" transistor in phase "C" is 2, the value of an "on" transistor in phase "B" is 4, and the value of an "on" transistor in phase "A" is 8. The value of an "off" transistor, regardless of the phase, is 0.

Accordingly, subroutine 200 begins at block 202, where the value of K is initialized to zero (00). Then, at decision block 204, it is determined whether both Q1 and Q5 are on. If so, then each digit in the value of K is incremented by 8, as shown in block 206. If both Q1 and Q5 are not on, then subroutine 200 proceeds to decision block 208 to see whether Q1 is off and Q5 is on. If this is the case, then the first digit of K is not incremented, while the second digit is incremented by 8 (i.e., K=K+08), as shown in block 210. However, if the answer to decision block 208 is "no", then subroutine 200 will not increment either digit of K. Then, regardless of the status of Q1 and Q5, subroutine will proceed to decision block 212 for inquiry of the states of the next pair of phase transistors, Q2 and Q6.

It will be seen that the inquiries for the remaining transistor pairs for phases "B", "C" and "D" are the same as that for phase "A", with the exception that the incremental adjustments to the digits of K will be different depending on the phase. It will be further noted that since the control of the SRM is such that transistors from different phases can be on at the same time, the value of K may be incremented more than once as the subroutine 200 progresses to the end. In addition, the subroutine 200 may also be implemented through other techniques, such as by using case function in C-code, for example.

Finally, once the value of K is ultimately established, it is further analyzed to see which of a number if allowable values it has. Then, based on the particular value, a specific set of equations are used (given the sensed sample and hold values of the currents through S1 and S2) to calculate the phase currents $I_A$, $I_B$, $I_C$ and $I_D$. This is illustrated by the subroutine 300 shown in FIG. 7(b). Beginning at block 302, the values of each of the phase currents are initialized to zero. Then, the subroutine proceeds through one or more of a series of decision blocks 304a through 304l. In each block it is determined if K is equal to a certain value. For example, if K is equal to 88 (decision block 304a) then it is known from subroutine 200 that only transistors Q1 and Q5 are on. In this specific case, subroutine 300 proceeds to block 306a where the phase currents are determined. As shown in block 306a, $I_A$ is equal to the current through S1 ($I_{S1}$). If the motor is running in a clockwise direction, then ID is equal to the current through S2 ($I_{S2}$), while $I_B$ and $I_C$ are zero. If the motor is running in a counterclockwise direction, then $I_B$ is equal to $I_{S2}$, while $I_C$ and $I_D$ are zero.

On the other hand, if K does not equal 88 at decision block 304a, subroutine 300 proceeds to the next decision block 304b to see if K equals the next allowable value, 8C. Again, since K is a two digit, hexadecimally coded number, the value 8C would indicate that transistors Q1 and Q5 are on, as well as low-side transistor Q6 (since K=88+04=8C). For this value of K, subroutine 300 would then proceed to block 306b, where the current in phase "A" is calculated to be $I_A=I_{S1}-I_{S2}$, and the current in phase "D" is calculated to be $I_D=I_{S2}$. It will be appreciated, however, that those skilled in the art may specifically implement the algorithm in different ways.

Figure 7B:
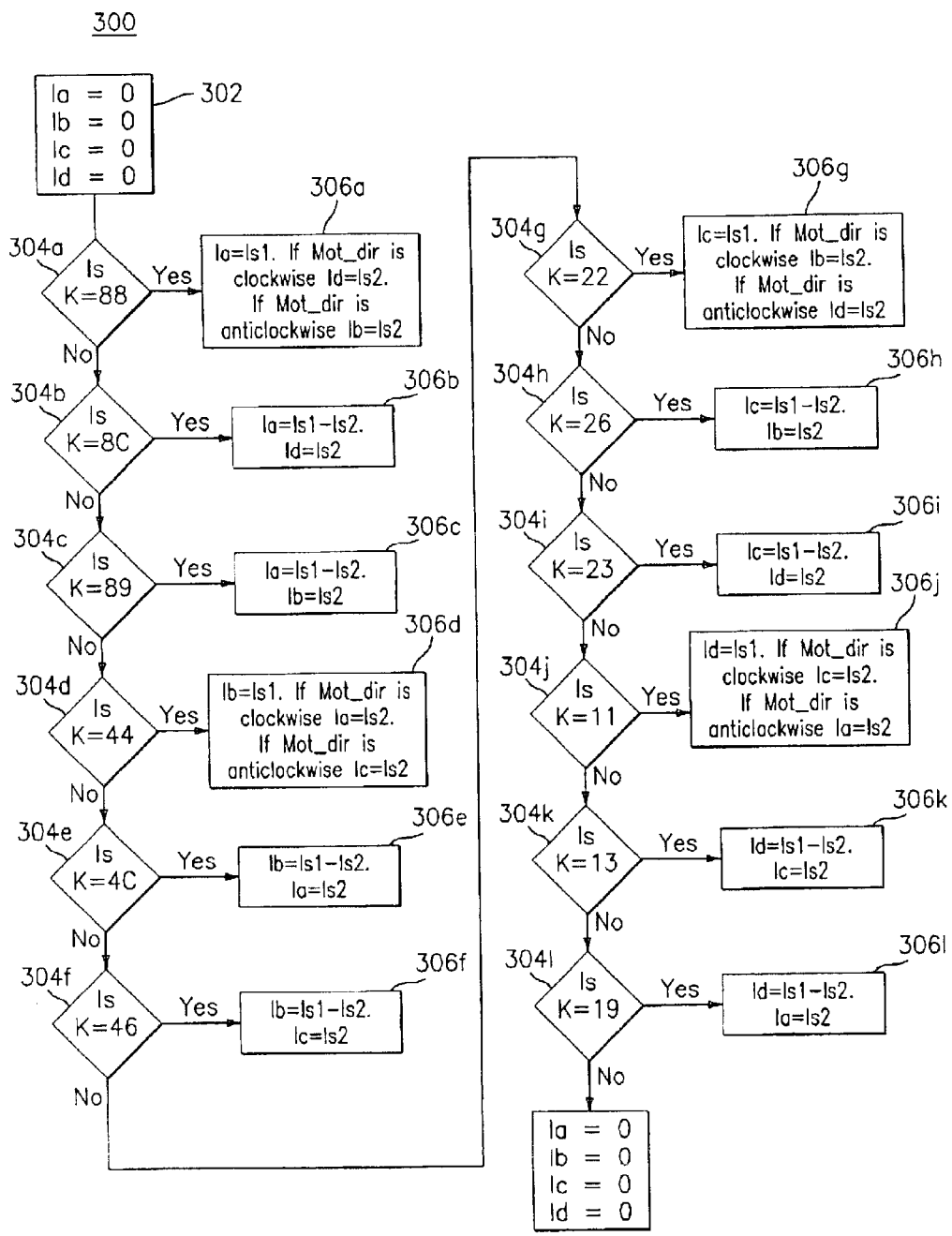
FIG. 7(b) is a flow diagram illustrating one possible method of calculating current flow in each phase, based upon the conduction mode K determined in FIG. 7(a), and the value of the currents sensed by the two current sensing resistors in the SRM drive circuit.

As can be seen from FIG. 7(b), the subroutine 300 will continue through the decision blocks until it finds the matching value for K. It will further be appreciated that the particular order in which the twelve values of K (three conduction states for each of four phases) are polled may be varied from the exemplary embodiment shown in the figure.

Figure 8:
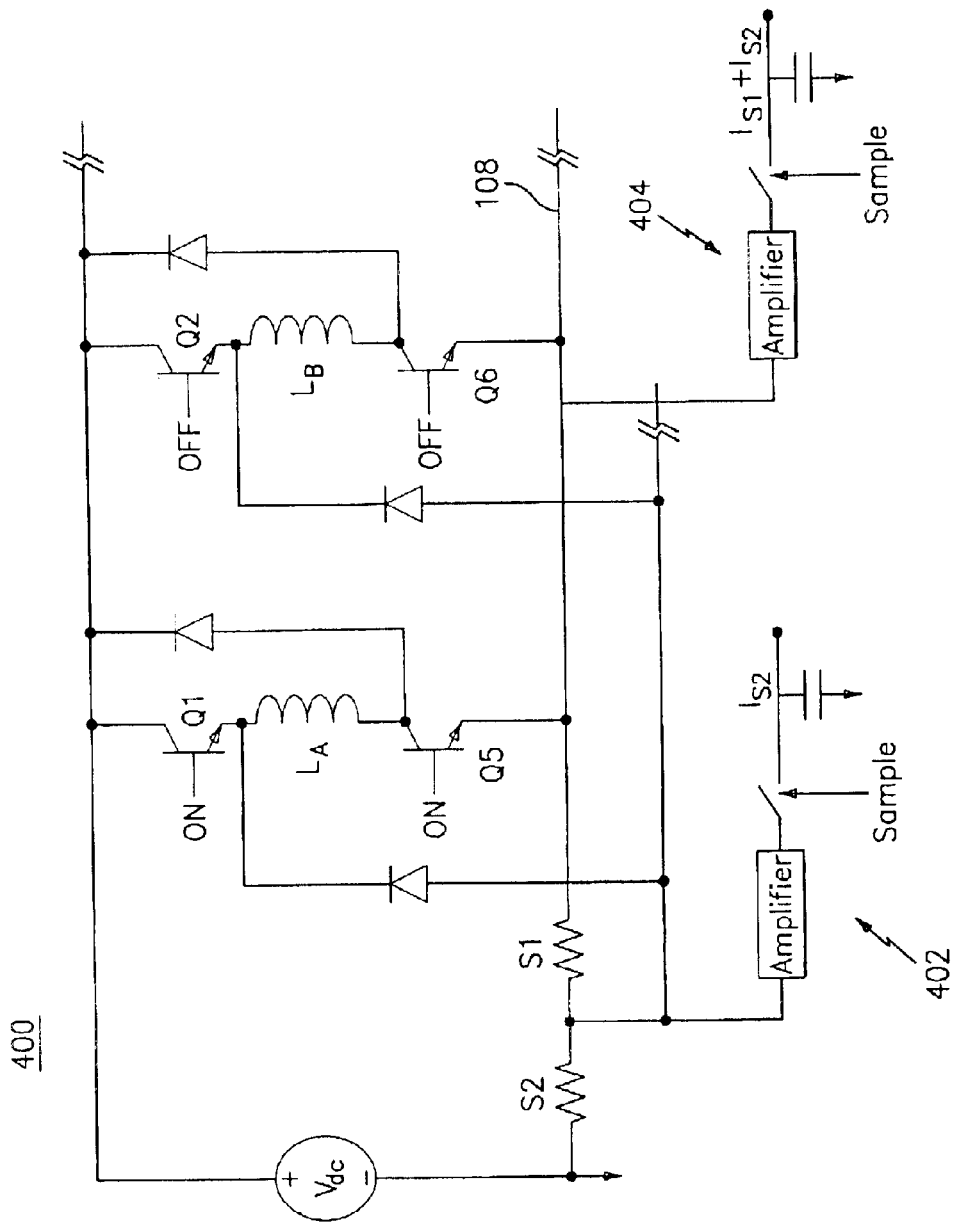
FIG. 8 is a schematic diagram of an alternative embodiment of the SRM drive circuit of FIG. 2.

In addition, the applicability of the above described current sensing technique is not limited by the specific circuit topology shown in FIG. 2. For example, FIG. 8 illustrates an alternative embodiment of an SRM drive circuit 400 in which S1 and S2 are connected in series with one another in the first ground bus 108. A pair of current sample and hold circuits 402, 404 are connected to opposite sides of S1, such that sample and hold circuit 402 senses the current through S2 only, while sample and hold circuit 404 senses the current through both S1 and S2. In this configuration, the equations used in FIG. 7(b) will change, but the underlying principle is the same. That is, the use of just a pair of inexpensive resistive elements may be substituted for a Hall sensor in each phase.

As will also be appreciated, the disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining phase current for each of a plurality of individual phase coils of a switched reluctance machine (SRM), the method comprising:
    determining a first bus current passing through a first resistive element in an SRM drive circuit;
    determining a second bus current passing through a second resistive element within said SRM drive circuit;
    determining a conduction mode, K, of said SRM drive circuit, said conduction mode being based upon an ON/OFF state of each of a pair of switching transistors controlling current through each of the plurality of individual phase coils; and
    calculating the phase current through each of the plurality of individual phase coils, based upon said conduction mode and said determined first bus current and second bus current passing through said first and second resistive elements.

2. The method of claim 1, wherein K is determined by summing one or more weighted values corresponding to said ON/OFF state of each of said pair of switching transistors.

3. The method of claim 2, wherein K is a two-digit number having a first digit indicative of the ON/OFF state of a high-side transistor within each of said pair of switching transistors, and a second digit indicative of the ON/OFF state of a low-side transistor within each of said pair of switching transistors.

4. The method of claim 3, further comprising applying a specific set of current equations to determine the phase current through each of the plurality of individual phase coils, said specific set of current equations being dependent upon a specific value of K.

5. The method of claim 4, wherein said specific set of current equations are based upon an operating direction of the SRM.

6. The method of claim 1 wherein the current through said first and second resistive elements are determined through a pair of corresponding sample and hold circuits, said sample and hold circuits being activated in accordance with a center-based pulse width modulation (PWM) technique.

7. The method of claim 1, wherein the switched reluctance machine includes at least four phases, and wherein current is directly sensed only through said first and second resistive elements.

8. An apparatus for determining phase current for each of a plurality of individual phase coils of a switched reluctance machine (SRM), comprising:
    an SRM drive circuit including a pair of switching transistors associated with each of the plurality of individual phase coils;
    a first resistive element in selective connection with each of the plurality of individual phase coils; and
    a second resistive element in selective connection with each of the plurality of individual phase coils;
    wherein the phase current for each of the plurality of individual phase coils is calculated based upon values of current sensed in said first and second resistive elements and upon an ON/OFF state of each of said pair of switching transistors.

9. The apparatus of claim 8, wherein said SRM drive circuit further includes a pair of freewheeling diodes associated with each of the plurality of individual phase coils, and said pair of switching transistors further includes a high-side transistor connected to a positive terminal of a DC power source and a low-side transistor coupled to a negative terminal of said DC power source.

10. The apparatus of claim 9, further comprising a first sample and hold circuit for sampling current passing through said first resistive element and a second sample and hold circuit for sampling current passing through said second resistive element.

11. The apparatus of claim 9, wherein:
    said first resistive element is included within a first ground bus, said first ground bus having each of said low-side transistors connected thereto; and
    said second resistive element is included within a second ground bus, said second ground bus having each of a plurality of low-side freewheeling diodes connected thereto.

12. The apparatus of claim 9, further comprising:
    a processing device, said processing device calculating the phase current for each of the plurality of individual phase coils from said values of current sensed in said first and second resistive elements, and from a conduction mode, K, said conduction mode further being determined from said ON/OFF state of each of said pair of switching transistors.

13. The apparatus of claim 12, wherein K is a two-digit number having a first digit indicative of the ON/OFF state of said high-side transistors within each of said pair of switching transistors, and a second digit indicative of the ON/OFF state of said low-side transistors within each of said pair of switching transistors.

14. The apparatus of claim 12, wherein said processing device applies a specific set of current equations to determine the phase current through each of the plurality of individual phase coils, said specific set of current equations being dependent upon a specific value of K.

15. The apparatus of claim 14, wherein said specific set of current equations applied by said processing device is based upon an operating direction of the SRM.

16. A storage medium, comprising:
    a machine readable computer program code for determining phase current for each of a plurality of individual phase coils of a switched reluctance machine (SRM); and instructions for causing a computer to implement a method, the method further comprising:
- determining a first bus current passing through a first resistive element in an SRM drive circuit;
- determining a second bus current passing through a second resistive element within said SRM drive circuit;
- determining a conduction mode, K, of said SRM drive circuit, said conduction mode being based upon an ON/OFF state of each of a pair of switching transistors controlling current through each of the plurality of individual phase coils; and
- calculating the phase current through each of the plurality of individual phase coils, based upon said conduction mode and said first bus determined current and said second bus current passing through said first and second resistive elements.

* * * * *